United States Patent
Berger et al.

(10) Patent No.: US 9,537,206 B2
(45) Date of Patent: Jan. 3, 2017

(54) FORCE APPLICATION RING FOR FOAMED RADOMES

(71) Applicant: Rohde & Schwarz GmbH & Co. KG, Munich (DE)

(72) Inventors: Anton Berger, Schliersee (DE); Günter Neumann, Feldkirchen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 332 days.

(21) Appl. No.: 14/342,863

(22) PCT Filed: Oct. 4, 2012

(86) PCT No.: PCT/EP2012/069569
§ 371 (c)(1),
(2) Date: Mar. 5, 2014

(87) PCT Pub. No.: WO2013/050440
PCT Pub. Date: Apr. 11, 2013

(65) Prior Publication Data
US 2014/0227027 A1    Aug. 14, 2014

(30) Foreign Application Priority Data
Oct. 4, 2011 (DE) .......................... 10 2011 083 951

(51) Int. Cl.
*H01Q 1/42* (2006.01)

(52) U.S. Cl.
CPC .............. *H01Q 1/42* (2013.01); *Y10T 403/642* (2015.01)

(58) Field of Classification Search
CPC .............. Y10T 403/475; Y10T 403/472; Y10T 403/7117; Y10T 403/7037; F16D 1/06; H01Q 1/42

USPC ............................................. 343/872
See application file for complete search history.

(56) References Cited

U.S. PATENT DOCUMENTS

| | | | | |
|---|---|---|---|---|
| 2,650,943 A | * | 9/1953 | Leuchs | H05B 7/14 373/91 |
| 3,594,027 A | * | 7/1971 | Ressler | B29C 65/568 102/214 |
| 4,659,598 A | * | 4/1987 | Traut | B29C 43/12 343/872 |

(Continued)

FOREIGN PATENT DOCUMENTS

DE    2 323 501 A    11/1974
DE    30 37 726 A1    5/1982

(Continued)

OTHER PUBLICATIONS

International Search Report mailed Dec. 21, 2012, issued in the corresponding International Application No. PCT/EP2012/069569, filed Oct. 4, 2012, 3 pages.

(Continued)

*Primary Examiner* — Daniel P Stodola
*Assistant Examiner* — Jonathan Masinick
(74) *Attorney, Agent, or Firm* — Christensen O'Connor Johnson Kindness PLLC

(57) ABSTRACT

A force-applying element for fixing radomes provides an annular flange region. The force-applying element provides at least one fixing region, which extends from the flange region in the direction towards the radome to be fixed, and its outer surfaces are surrounded by the radome in a form-fit manner.

12 Claims, 3 Drawing Sheets

(56) References Cited

U.S. PATENT DOCUMENTS

| | | | | |
|---|---|---|---|---|
| 4,859,107 | A * | 8/1989 | Box | F16B 11/006 |
| | | | | 343/709 |
| 7,027,003 | B2 * | 4/2006 | Sasaki | H01Q 13/02 |
| | | | | 343/772 |
| 8,063,837 | B1 * | 11/2011 | Jennings | H01Q 1/1214 |
| | | | | 343/705 |
| 2002/0005815 | A1 | 1/2002 | Spaulding | |
| 2005/0030250 | A1 | 2/2005 | Gottl | |
| 2007/0139288 | A1 | 6/2007 | Shigemoto | |
| 2008/0129618 | A1 * | 6/2008 | Byrne | H01Q 1/1271 |
| | | | | 343/713 |
| 2012/0019394 | A1 * | 1/2012 | Loi | E21B 17/006 |
| | | | | 340/856.4 |

FOREIGN PATENT DOCUMENTS

| | | |
|---|---|---|
| DE | 32 10 220 A1 | 9/1983 |
| DE | 34 30 657 A1 | 3/1986 |
| DE | 689 10 861 T2 | 3/1994 |
| DE | 201 09 909 U1 | 9/2001 |
| DE | 101 28 984 A1 | 1/2003 |
| DE | 10 2005 018 052 B4 | 11/2006 |
| EP | 1 478 050 A1 | 11/2004 |
| EP | 1 667 277 A1 | 6/2006 |
| FR | 2 626 958 A1 | 8/1989 |
| GB | 2 197 704 A | 5/1988 |
| JP | 9-236653 A | 9/1997 |

OTHER PUBLICATIONS

International Preliminary Report on Patentability and Written Opinion mailed Apr. 8, 2014, issued in the corresponding International Application No. PCT/EP2012/069569, filed Oct. 4, 2012, 9 pages.

\* cited by examiner

FORCE APPLICATION RING FOR FOAMED RADOMES

FIELD

The invention relates to a force-applying element, especially a force-applying ring, for fixing radomes, especially foamed radomes.

BACKGROUND

Certain types of antennas, especially those which are printed on printed-circuit boards (English: patch antennas) must be covered with a protective covering in order to guarantee error-free operation outdoors. This protective layer, also referred to as a radome, protects the antenna element from the influence of weather and animals. In this context, the radome is made from a synthetic material which attenuates the electromagnetic waves of the antenna elements in the frequency range operated as little as possible. By preference, the radome provides, for example, the shape of a hollow cylinder or ellipsoid, which is closed at one end in a rounded shape. The antenna element is introduced into the radome through the opening, whereas the antenna flange is connected more or less rigidly to the radome.

A rod-shaped antenna arrangement which is protected from external influences by means of a cylindrical radome is known from US 2005/0030250 A1. The radome provides a relatively thin external wall, which is plugged into a groove of the antenna flange extending circumferentially. The disadvantage with US 2005/0030250 A1 is that a mechanically stable and watertight contact between the radome and the antenna flange cannot be achieved with this plug connection.

SUMMARY

Accordingly, the object of the force-applying element according to the invention is to provide a solution in order to connect a radome as simply as possible in a mechanically stable manner to an antenna flange and to manufacture this radome as simply as possible.

The object is achieved with regard to the force-applying element by the features of claim 1. Advantageous further developments of the force-applying element are specified in the respective dependent claims.

The force-applying element according to the invention is used for fixing radomes and provides an annular-flange region, whereas the force-applying element provides at least one fixing region, which extends from the flange region in the direction towards the radome to be fixed and of which the outer surfaces are surrounded by the radome in a form-fit manner.

It is particularly advantageous that the force-applying element for fixing radomes provides at least one fixing region, which extends from the flange region in the direction towards the radome to be fixed and of which the outer surfaces are surrounded by the radome in a form-fit manner. As a result of the fact that the fixing region projects from the annular flange region, outer surfaces are formed, which the radome can contact in a form-fit manner. A mechanical connection of this kind can be made directly during the manufacture of the radome, so that an antenna flange can subsequently be connected directly to the annular-flange region.

Furthermore, it is particularly advantageous if the radome of the force-applying element according to the invention is a foam radome, and if the fixing region is surrounded by the foam radome in a form-fit manner and/or if the fixing region narrows in its diameter towards the top and/or if the fixing region is embodied in an annular shape. If the radome is a foam radome, which can be manufactured by foaming a synthetic material, the force-applying element can be rigidly connected to the foam radome during the manufacturing process. In this case, the fixing region is surrounded by the foam radome in a form-fit manner, whereas the mechanical stability can be further increased if the fixing region is embodied in an annular shape. In this case, the size of the outer surfaces, which are surrounded by the radome in a form-fit manner, increases significantly, so that the force-applying element is connected to the radome in a mechanically stable manner.

Furthermore, an advantage is achieved with the force-applying element according to the invention if the fixing region of the force-applying element provides an undercut in its geometry, and if this undercut in the fixing region of the force-applying element is formed by at least one opening, which is filled by the radome, especially the foam radome. This undercut, which is formed by at least one opening, prevents the foam radome from being pulled from the force-applying element and from being rotated relative to the latter.

Additionally, an advantage is achieved with the force-applying element according to the invention if the at least one opening in the fixing region of the force-applying element connects both outer surfaces of the fixing region to one another in a tunnel shape. In this case, the radome, especially the foam radome, contacting in a form-fit manner is surrounded on four sides by the fixing region of the force-applying element. It is therefore no longer possible to rotate or pull the foam radome from the force-applying element.

Furthermore, an advantage is achieved with the force-applying element according to the invention if the width of the at least one opening in the fixing region of the force-applying element is greater than a height of the at least one opening. This means that the fixing region must project into the radome, especially the foam radome, only to the extent that a mechanically stable connection is achieved. An adequate stability with regard to an axial pulling movement or a radial rotating movement can be effectively achieved by selecting a greater width.

Furthermore, an advantage is achieved with the force-applying element according to the invention if the fixing region provides an annular profile on one or both outer surfaces, whereas the radome, especially the foam radome, is in contact within the annular profile in a form-fit manner and is accordingly secured against a pulling movement. Additionally, an advantage is achieved with the force-applying element according to the invention if the annular profile is formed by grooves with a spacing distance from one another. These grooves can be milled into the force-applying element in a particularly simple manner or applied in a casting mould for the force-applying element. The mechanical resistance to an axial pulling movement and a radial rotating movement can be further increased by choosing a different depth of these mutually spaced grooves. Moreover, an advantage is achieved with the force-applying element according to the invention if one or both outer surfaces of the fixing region provide indentations and/or notches which are filled by the radome in a form-fit manner. As a result of the greater or lesser size of the indentations and/or notches, the pulling of the foam radome from the force-applying element can be effectively prevented.

Additionally, an advantage is achieved with the force-applying element according to the invention, if one or both outer surfaces of the fixing region provide a corrugated profile, wherein the corrugations on one or both outer surfaces have a positive and/or negative gradient, whereas the corrugated profile is surrounded by the radome, especially the foam radome, in a form-fit manner. Such a corrugated profile also reinforces the mechanical resistance with regard to an axial pulling movement, so that the foam radome is connected to the force-applying element in a mechanically stable manner.

Finally, it is also advantageous with the force-applying element according to the invention if the force-applying element is embodied in one piece with the fixing region and the flange region. On the one hand, this simplifies assembly and manufacture of the radome, especially the foam radome, and, on the other hand, leads to increased mechanical stability, which takes into consideration the different areas of application for foam radomes.

Furthermore, it is particularly advantageous with the force-applying element according to the invention if the side of the flange region facing away from the fixing region provides one or more boreholes and/or if the one or more boreholes extend from the flange region into the fixing region, and if the one or more boreholes are threaded boreholes and/or if a separate threading is lathed into the one or more boreholes. By means of these boreholes, the flange region can be connected in a particularly simple manner to another component, such as an antenna flange. The fact that a separate threading can be lathed into the boreholes means that softer materials can also be used for the manufacture of the force-applying element, without the threaded boreholes being subject to wear by a plurality of assembly processes.

Additionally, it is advantageous with the force-applying element according to the invention if the side of the flange region facing away from the fixing region is embodied to be flat. This flat embodiment simplifies the connection of the flange region to other components, such as an antenna flange, and allows this connection to be sealed in a watertight manner by means of a sealing ring or a sealing compound.

Furthermore, an advantage is achieved with the force-applying element according to the invention if the fixing region provides a rounded V-shape or a rounded T-shape or a rounded H-shape, whereas the opening of the V-shape or the underside of the T-shape or H-shape adjoins the flange region. In this manner, the radome, especially the foam radome, can be connected in a mechanically stable manner to the force-applying element.

An advantage is also achieved with the force-applying element according to the invention, if the radome is made from polyurethane, and if the force-applying element is made from aluminium or stainless steel or a synthetic material. If the radome is made from polyurethane, this can be very simply foamed, whereas the force-applying element is connected to the foam radome directly during the foaming process. In this manner, the required indentations, notches, undercuts or grooves can be surrounded by the foam radome in a form-fit manner, whereas it is also ensured at the same time that a watertight connection is manufactured between the foam radome and the force-applying element.

BRIEF DESCRIPTION OF THE DRAWINGS

Various exemplary embodiments of the invention are described by way of example below with reference to the drawings. Identical subject matters provide the same reference numbers. In detail, the corresponding figures of the drawings are as follows.

DETAILED DESCRIPTION

Figure 1:
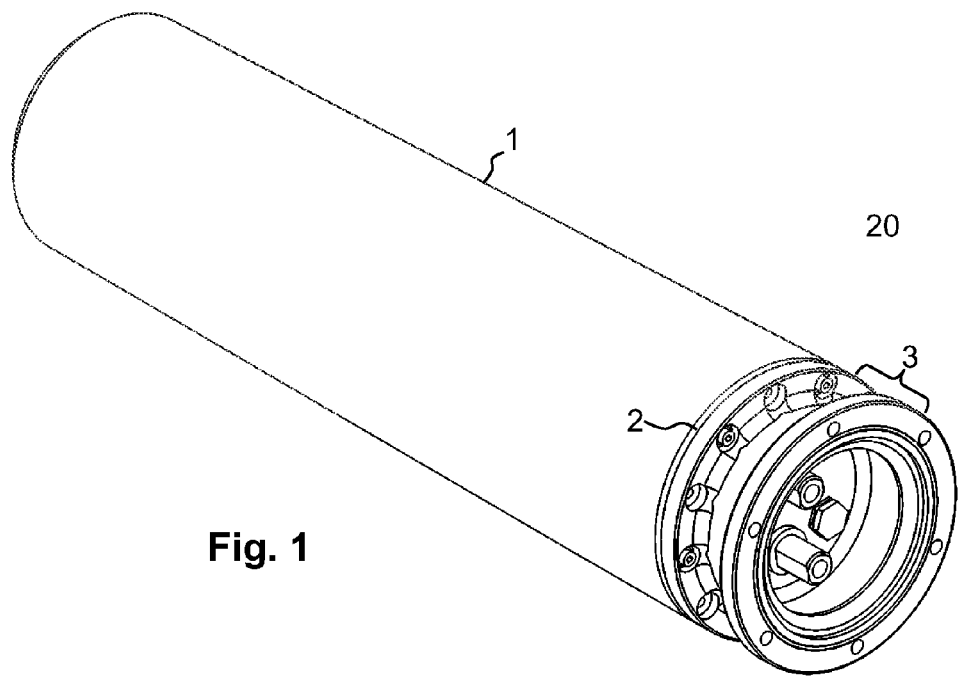
FIG. 1 an example of a radome for weather protection of antennas with the force-applying element according to the invention, onto which an antenna flange is screwed.

FIG. 1 shows a radome 1, especially a foam radome 1, for weather protection 1 of antennas. The foam radome 1 here is embodied as a hollow cylinder, whereas the one end, in this case, the upper end, is closed. The walls of the foam radome preferably have a significant thickness, for example, of a few millimeters. For fixing, the foam radome 1 is further connected to the force-applying element 2 according to the invention. The force-applying element 2 according to the invention provides an annular embodiment. As will be explained later, this connection is mechanically stable and preferably watertight. Furthermore, an antenna flange 3 is also connected to the force-applying element 2 according to the invention. A holder for a plurality of antenna elements, which are not visible in the exemplary embodiment shown in FIG. 1, is connected to this antenna flange 3. These antenna elements are disposed inside the foam radome 1 and are protected by the latter from weather and animals. The antenna flange 3 is connected to the force-applying element 2 in a mechanically stable and form-fit manner by at least one screw connection. The antenna flange 3 provides further screw connections, with which it can be attached, for example, onto rooftops or boats.

Figure 2:
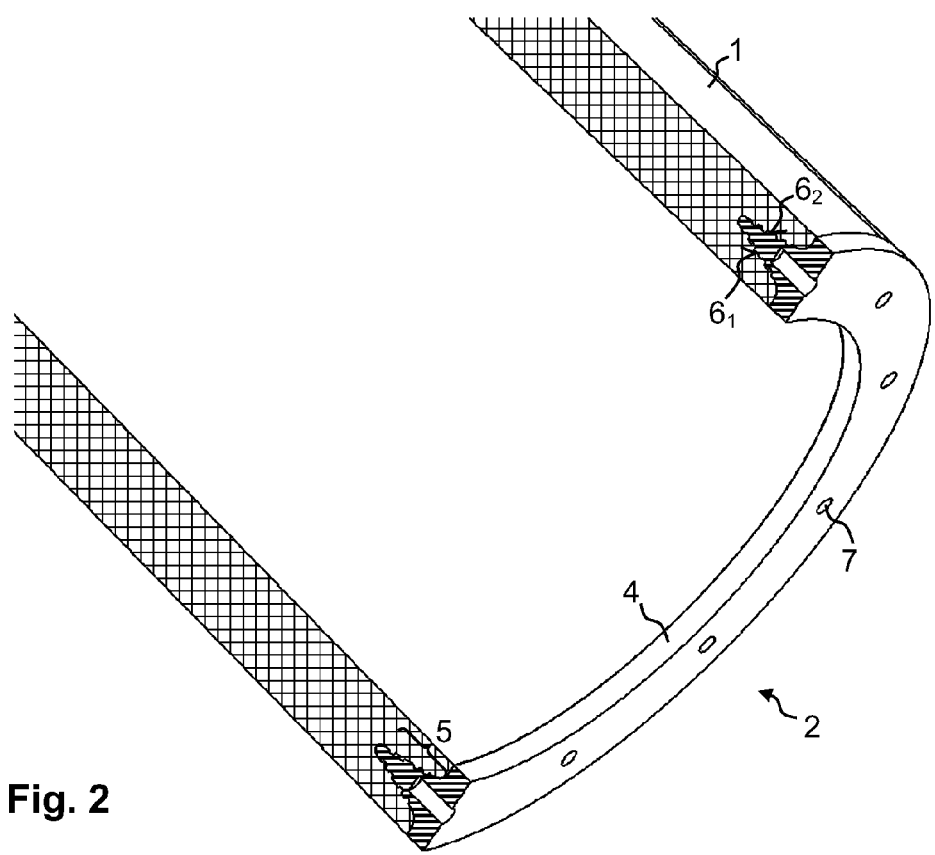
FIG. 2 a cross-section through a radome and an exemplary embodiment of an associated force-applying element according to the invention.

FIG. 2 shows a cross-section through a radome 1, especially a foam radome 1 and the associated force-applying element 2 according to the invention. It is clearly evident that the force-applying element 2 is surrounded by the foam radome 1 in a form-fit manner. In more precise terms, the force-applying element 2 comprises an annular flange region 4 and a fixing region 5. However, the force-applying element 2 is embodied in one piece. This means that the fixing region 5 is connected inseparably to the flange region 4. The fixing region 5 extends from the flange region 4 in the direction towards the foam radome 1 to be fixed, whereas its outer surfaces $6_1$ and $6_2$ are completely surrounded by the foam radome 1 in a form-fit manner. The phrase "completely surrounded in a form-fit manner" should be understood here especially in the sense that air bubbles occurring in the course of the manufacturing process, which ensure that another additional, partial layer of air is possibly present between the outer surfaces $6_1$ and $6_2$ and the foam radome 1, do not exclude the form fit. It is clearly evident in FIG. 2 that the fixing region 5 projects above the flange region 4.

Moreover, the flange region 4 provides various boreholes 7. These boreholes 7 pass from the flange region 4 at least partially into the fixing region 5. If the flange region 4 is relatively thicker, it is sufficient if the boreholes 7 extend only in the flange region 4. The boreholes 7 in the exemplary embodiment are threaded boreholes. However, it is also possible for an additional threading to be lathed into the boreholes 7. This is particularly meaningful if the force-applying element 2 is made of metal, such as aluminium, or synthetic material, so that the force-applying element 2 can be connected to an antenna flange 3 in a multiple manner by means of an additional stainless steel threading. For example, if the force-applying element is manufactured from stainless steel, no additional screw threading is necessary, because such a threading can withstand several screwing and unscrewing processes without difficulty.

The radome 1 is preferably made of polyurethane, which is produced in a strongly exothermic process. In order to connect the force-applying element 2 according to the invention to the foam radome 1 in a form-fit manner, the force-applying element 2 is clamped into a mould. This mould is also embodied as a hollow cylinder, whereas the polyurethane is mixed together in a mixing gun and injected into this mould. After the process of mixing the individual compounds, polyurethane, which forms the foam radome 1 and connects the latter to the force-applying element 2 in a form-fit manner, is formed. In this context, the foam radome 2 is preferably connected to the fixing region 5, because the corresponding injection mould does not allow a connection of the foam radome 1 to the flange region 4. After the foam radome 1 has cooled down and hardened, a watertight and form-fit connection is provided between the foam radome 1 and the force-applying element 2. Furthermore, this form-fit and watertight connection is mechanically very stable.

It is clearly evident from FIG. 2 that the fixing region 5 narrows in its diameter towards the top, that is, in the direction towards the foam radome 1. In the exemplary embodiment from FIG. 2, the fixing region 5 is embodied in an annular shape. However, it is also possible for the fixing region 5 not to provide a continuous annular structure, but to be formed, for example, by individual teeth with a spacing distance from one another. The illustrated fixing region 5 provides notches 61 and/or indentations 60 in its outer surfaces $6_1$, $6_2$. These notches 61 and/or indentations 60 are completely filled by the foam radome 1. The foam radome 1 is in contact within these notches 61 and/or indentations 60 in a form-fit manner.

It is also possible for only one of the two outer surfaces $6_1$, $6_2$ of the fixing region 5 to provide indentations 60 and/or notches 61 which are filled with the foam radome 1 in a form-fit manner, instead of both outer surfaces $6_1$, $6_2$. As a result of these indentations 60 and/or notches 61, the pulling of the foam radome 1 from the force-applying element 2 is generally prevented. The pulling is equivalent to a movement in the axial direction.

It is also possible for one or both outer surfaces $6_1$, $6_2$ of the fixing region 5 to provide a corrugated profile. In this context, the corrugations can have a positive and/or a negative gradient on one or both outer surfaces $6_1$, $6_2$. In this context, the corrugated profile is also surrounded in a form-fit manner by the foam radome 1, or respectively, the valleys of the corrugations are filled in a form-fit manner with the foam radome 1.

Figure 3:
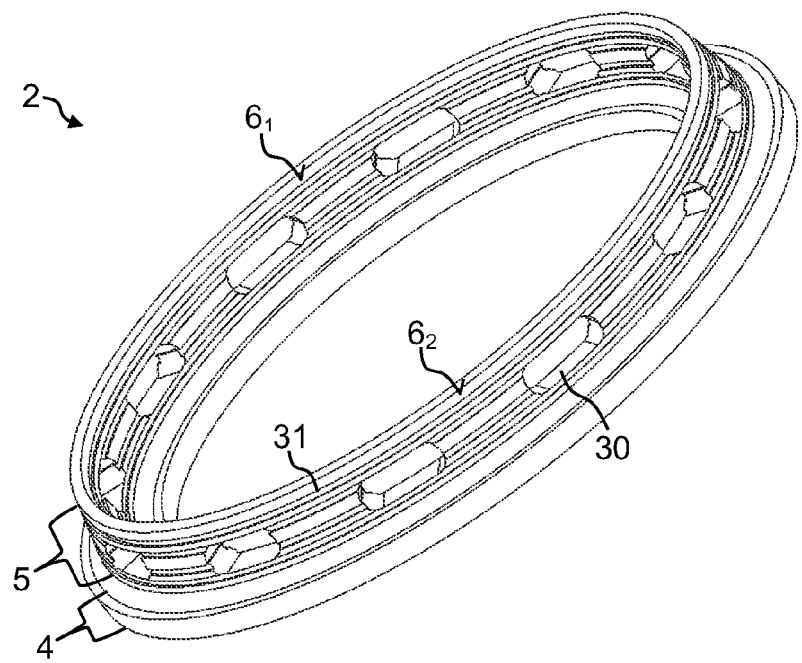
FIG. 3 a three-dimensional view of an exemplary embodiment of the annular force-applying element according to the invention with a fixing region and a flange region.

FIG. 3 shows a three-dimensional view of the annular force-applying element 2 according to the invention, whereas the fixing region 5 and the flange region 4 can be clearly identified. The fixing region 5 in the exemplary embodiment from FIG. 3 is also embodied in an annular shape. Other embodiments of the fixing region 5, such as teeth and/or peaks with a spacing distance from one another, are also conceivable. The fixing region 5 in the exemplary embodiment from FIG. 3 provides a V-shaped structure, whereas the opening of the V-shape (top of the V), adjoins the flange region 4. Accordingly, the diameter of the fixing region 5 narrows from the flange region 4 towards the foam radome 1.

It is clearly evident that the fixing region 5 of the force-applying element 2 provides an undercut 30 in its geometry. In the exemplary embodiment from FIG. 3, this undercut 30 is formed in the fixing region 5 of the force-applying element 2 by at least one opening 30. As soon as the force-applying ring 2 is connected to the foam radome 1 in a form-fit manner, this opening 30 is filled by the foam radome 1. This means that the foam radome 1 can no longer be pulled from the force-applying element 2 according to the invention. The undercut 30, which provides the form of an opening 30, also means that the foam radome 1 can no longer be rotated relative to the force-applying element 2.

According to the exemplary embodiment from FIG. 3, the force-applying element 2 preferably provides several such undercuts 30, that is to say, such openings 30, which are arranged in the fixing region 5 with a radial spacing distance from one another. In the exemplary embodiment from FIG. 3, a total of twelve openings 30 are embodied in the fixing region 5. In this context, the openings 30 are embodied in the fixing region 5 in such a manner that they create a hollow cavity, which can be reached from both outer surfaces $6_1$, $6_2$. This means that the openings 30 in the fixing region 5 of the force-applying element 2 connect both outer surfaces $6_1$, $6_2$ of the fixing region 5 to one another in the manner of a tunnel. This means that the foam radome 1 contacting in a form-fit manner is surrounded on four sides by the fixing region 5 of the force-applying element 2. Accordingly, an effective protection against a movement in the axial direction and against a movement in the radial direction is achieved, so that the foam radome 1 can neither be pulled from the force-applying element 2 nor rotated relative to the latter.

By preference, the width in the radial direction of the at least one opening 30 within the fixing region 5 of the force-applying element 2 is greater than the height in the axial direction of the at least one opening 30. This means that an effective protection against rotating and pulling is achieved, even with a relatively small height of the fixing region 5.

These openings 30 can be manufactured by means of a milling process. The openings 30 can also be introduced in a casting process.

FIG. 3 also shows that the fixing region 5 provides an annular profile 31 on both outer surfaces $6_1$, $6_2$. Of course, this annular profile 31 can also be embodied on only one of the two outer surfaces $6_1$, $6_2$ of the fixing region 5. In this context, the annular profile 31 is formed by grooves 31 with a spacing distance from one another. These grooves 31 can be manufactured by a milling process or by a casting process or by a stamping process. The mutually spaced grooves 31 need not be present around the entire circumference of the annular fixing region 5. The mutually spaced grooves 31 are separated from one another by a web in their centre, whereas the depth of the mutually spaced grooves 31 can vary. The mutually spaced grooves 31 provide protection with regard to the foam radome 1 being pulled away from the force-applying element 2.

Furthermore, the depth of individual grooves 31 can be varied, so that a protection against rotation is also provided. In this case, the depth of the individual grooves 31 alternates several times, or respectively, the depth of the individual grooves 31 is varied several times around one circumference. Accordingly, the foam radome 1 is in contact within the annular profile 31 or respectively within the individual grooves 31 in a form-fit manner.

Figure 4:
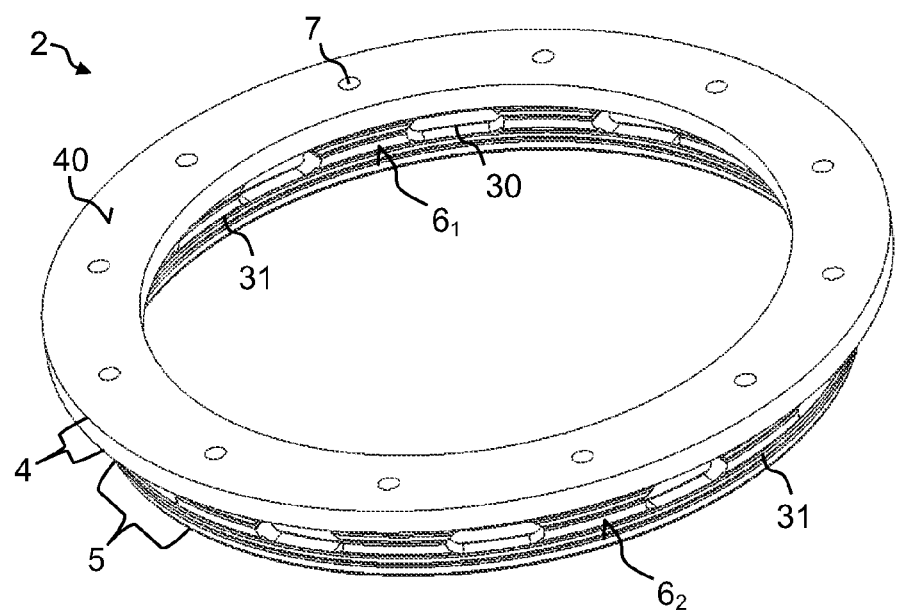
FIG. 4 a further three-dimensional view of the exemplary embodiment of the annular force-applying element according to the invention with a flange region and a fixing region.

FIG. 4 shows another three-dimensional view of the annular force-applying element 2 according to the invention with a flange region 4 and fixing region 5. It is clearly evident that the side 40 of the flange region 4 facing away from the fixing region 5 provides several boreholes 7. The side 40 facing away is the underside 40 of the flange region 4. It is clearly evident that the side 40 facing away from the fixing region 4, that is, the underside of the flange region 5, is embodied to be flat. This flat side 40 can be used as a contact surface for an antenna flange 3, which is screwed to the flange region via the boreholes 7. A sealing ring, which is not illustrated, or a sealing compound, which is not illustrated, can also be attached between the force-applying element 2 and the antenna flange 3. Accordingly, the foam radome 1 with the force-applying element 2 and the antenna flange 3 are sealed in a watertight manner.

Furthermore, the openings 30 and the grooves 31 are illustrated in FIG. 4. It is also clearly evident here that the grooves 31 are embodied on both outer surfaces 6₁, 6₂ of the fixing region 5 which narrows in its diameter.

Figure 5:
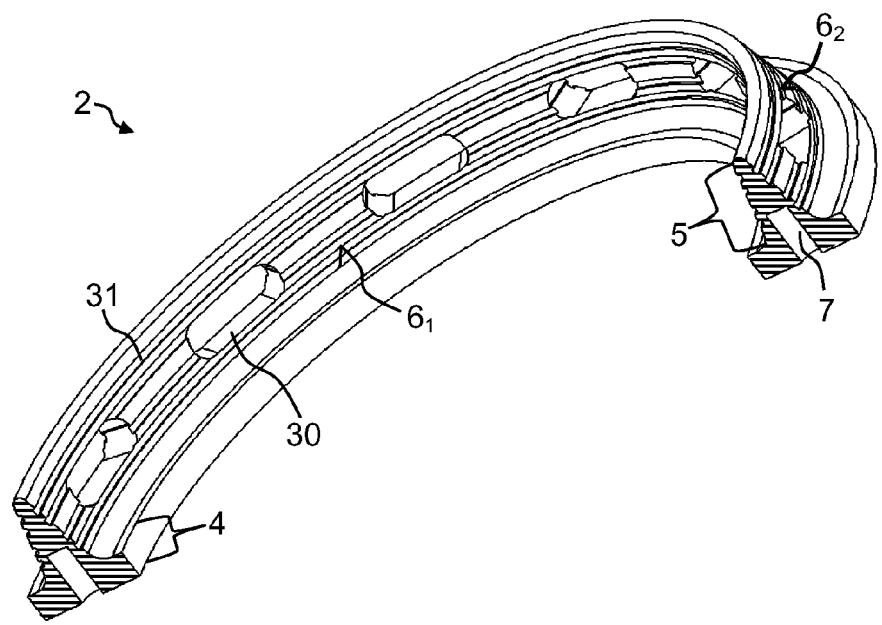
FIG. 5 a cross-section through the exemplary embodiment of the force-applying element according to the invention with a fixing region and a flange region.

FIG. 5 shows a cross-section through the force-applying element 2 according to the invention with a fixing region 5 and a flange region 4. It is clearly evident that the fixing region 5 is embodied in an annular shape around its entire circumference. This also applies for the flange region 4. It is also shown that the boreholes 7 extend through the flange region 4 into the fixing region 5. The fixing region 5 is embodied in a V-shape, whereas the opening of the V-shape adjoins the flange region 4. In this context, the V-shape is rounded at the corners. The outer surfaces 6₁, 6₂ of the fixing region 5 are also once again provided with grooves 31. The fixing region 5 also provides several openings 30, by means of which the two outer surfaces 6₁, 6₂ of the fixing region 5 are connected to one another. The foam radome 1 can circle in a form-fit manner within the illustrated openings 30, so that the foam radome 1 can neither be pulled from the force-applying element 2 nor rotate relative to the latter.

In order to achieve a good mechanical connection between the foam radome 1 and the force-applying element 2, the fixing region 5 is greater in height than the height of the flange region 4. In FIG. 5, it is evident that the fixing region is approximately two and a half times as high as the flange region 4.

Figures 6A, 6B, 6C:
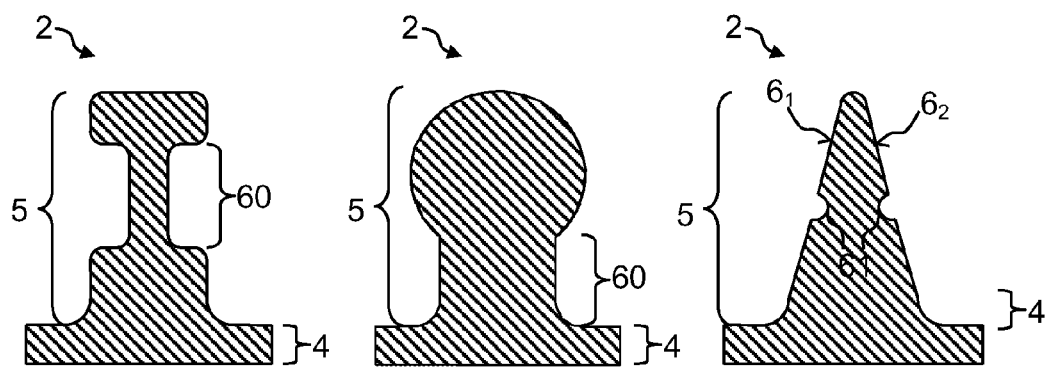
FIG. 6A a first exemplary embodiment of a cross-section through the force-applying element according to the invention with a fixing region and a flange region.
FIG. 6B a second exemplary embodiment of a cross-section through the force-applying element according to the invention with a fixing region and a flange region.
FIG. 6C a third exemplary embodiment of a cross-section through the force-applying element according to the invention with a fixing region and a flange region.

FIG. 6A shows a possible shape for a cross-section through the force-applying element 2 according to the invention with fixing region 5 and a flange region 4. It is evident that the fixing region 5 is higher than the flange region 4. However, this is illustrated in an exaggerated manner in the figure of the drawings. Furthermore, it is clearly evident that the flange region 4 is significantly wider than the fixing region 5. In the exemplary embodiment in FIG. 6A, the flange region 4 is approximately twice as wide as the fixing region 5. The fixing region 5 in the exemplary embodiment of FIG. 6A is embodied in an H-shape. In this context, the H is tilted on its side. All of the corners are rounded in order to avoid stress concentrations. An indentation 60 between the ends of the fixing region 5 is also clearly evident. The fixing region 5 can also be embodied without difficulty as a T-shape, whereas the wider end points in the direction towards the foam radome 1.

FIG. 6B shows a further possible shape for a cross-section through the force-applying element 2 according to the invention with a fixing region 5 and a flange region 4. It is also evident that the flange region 4 is significantly wider than the fixing region 5. By contrast, the fixing region 5 is significantly higher than the flange region 4. The fixing region 5 here is embodied as a sphere which is connected via a web to the flange region 5. The diameter of the sphere in this context is larger than the width of the web, but smaller than the width of the flange region 4. An indentation 60 in this context is also visible between the sphere and the flange region 4. The foam radome 1 can be disposed in contact within this indentation 60 in a form-fit manner. Accordingly, the foam radome is secured against a pulling movement. The foam radome 1 is thus connected in a mechanically rigid manner to the force-applying element 2.

FIG. 6C shows a further possible shape for a cross-section through the force-applying element 2 with a fixing region 5 and a flange region 4. In FIG. 6C also, the flange region 4 is significantly wider than the fixing region 5. By contrast, the fixing region 5 is significantly higher than the flange region 4. The fixing region 5 is embodied in a V-shape, whereas all of the corners are rounded. In this context, the V-shaped tip of the fixing region 5 points in the direction towards the foam radome 1. The outer surfaces 6₁, 6₂ of the fixing region 5 provide a rounded notch 61. The rounded notch 61 can also be a recess or a rounded groove 31. The notch 61 is completely filled by the foam radome 1. As a result of the notch 61, the foam radome 1 cannot be pulled from the force-applying element 2.

FIGS. 6A, 6B and 6C do not show any boreholes 7. Of course, boreholes can be used with the cross-sections from FIGS. 6A, 6B and 6C. Furthermore, no openings 30 are shown in the cross-sections from FIGS. 6A, 6B and 6C. Such openings can, however, also be embodied without difficulty in the cross-sections. This also applies if the fixing region 5 is formed from individual teeth or peaks with a spacing distance from one another, which can have the cross-section from FIG. 6A, 6B or 6C. The depth of the indentations 60 from FIGS. 6A and 6B and the depth of the notch 61 from FIG. 6C can be varied continuously, so that a protection against rotation is also achieved in the case of an annular force-applying element 2 with an annular fixing region 5.

The invention is not restricted to the exemplary embodiments described. All of the features described and/or illustrated can be combined with one another as required.

The invention claimed is:

1. A force-applying element for fixing radomes, comprising:
   an annular flange region; and
   at least one fixing region which extends from the annular flange region in the direction towards a foam radome to be fixed, the fixing region having an annular shape with a diameter that narrows in the direction towards the radome to be fixed, the fixing region including two outer surfaces and undercuts in the form of a plurality of tunnels that connect both outer surfaces of the fixing region to one another, such that the fixing region defining the tunnels surrounds portions of the foam radome to be fixed in a form-fit manner on four sides to prevent it from being rotated relative to the force-applying element or pulled from the force-applying element in an axial direction, the outer surfaces being configured to be surrounded by the foam radome to be fixed at least partially in a form-fit manner, wherein one or both outer surfaces of the fixing region provide indentations or notches, which are configured to be filled by the foam radome to be fixed in a form-fit manner and which are configured to prevent the foam radome to be fixed from being pulled from the force-applying element in an axial direction.

2. The force-applying element according to claim 1, wherein a width of the tunnels in the fixing region of the force-applying element is greater than a height of the tunnels.

3. The force-applying element according to claim 1, wherein the fixing region provides an annular profile on one or both outer surfaces.

4. The force-applying element according to claim 3, wherein the annular profile is formed by grooves that are mutually spaced or of varying depth.

5. The force-applying element according to claim 1, wherein one or both outer surfaces of the fixing region provide a corrugated profile, whereas the corrugations have a positive and/or a negative gradient on one or both outer surfaces.

6. The force-applying element according to claim 1, wherein the force-applying element is embodied in one piece with the fixing region and the flange region.

7. The force-applying element according to claim 6, wherein the side of the flange region facing away from the fixing region provides one or more boreholes and the one or more boreholes extend from the flange region into the fixing region.

8. The force-applying element according to claim 7, wherein the one or more boreholes are threaded boreholes or a separate thread is lathed into the one or more boreholes.

9. The force-applying element according to claim 1, wherein the side of the flange region facing away from the fixing region is embodied to be flat.

10. The force-applying element according to claim 1, wherein the fixing region provides a rounded V-shape or a rounded T-shape or a rounded H-shape, whereas an upper side of the V-shape or a lower side of the T-shape or H-shape adjoins the flange region.

11. The force-applying element according to claim 1, wherein the radome is made from polyurethane, and the force-applying element is made from metal, or from a synthetic material, and wherein the metal is selected from one of aluminum or stainless steel.

12. An apparatus, comprising:
an annular flange region; and
at least one annular fixing region configured to affix to a foam radome, the at least one annular fixing region extending from the annular flange region, wherein the at least one annular fixing region has a diameter that narrows as it extends from the annular flange region, the at least one fixing region including
an inner surface and an outer surface configured to be surrounded by the foam radome to be fixed, the inner and outer surfaces provided with indentations or notches that are configured to be filled by the foam radome to be fixed in a form-fit manner and are configured to prevent the foam radome to be fixed from being pulled from the apparatus in an axial direction; and
a plurality of slots formed in the at least one annular fixing region between the inner and outer surfaces and spaced apart in an annular manner, wherein the plurality of slots are configured to receive portions of the radome such that the fixing region defining the slots surrounds the portions of the foam radome to be fixed in a form-fit manner and prevents the radome from being rotated relative to the apparatus or pulled from the apparatus in an axial direction.

* * * * *